INVENTOR.
Francesco Perrotti and
BY Mario Valdivieso
Henry K. Fain
Attorney

Feb. 26, 1957   F. PERROTTI ET AL   2,782,987
APPARATUS FOR INDICATING THE MEAN SPEED OF A VEHICLE
Filed June 24, 1952                      2 Sheets-Sheet 2
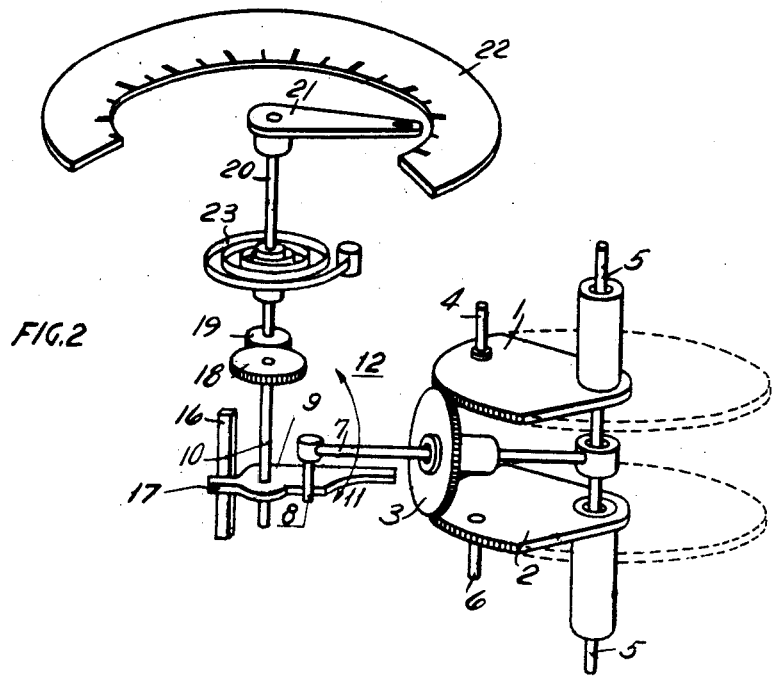
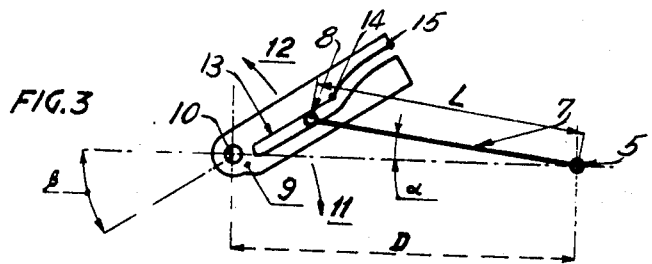
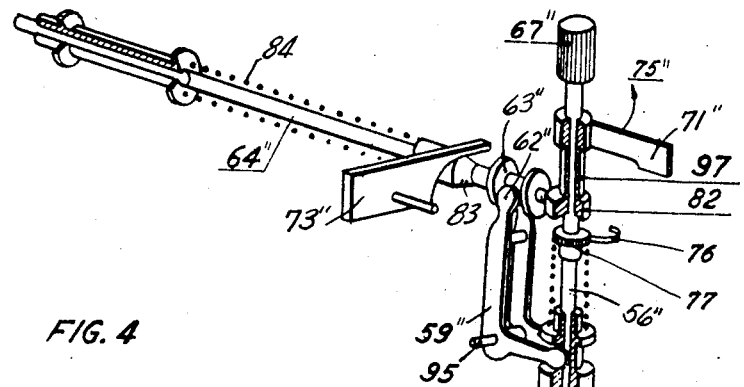
INVENTOR
Francesco Perrotti and
Mario Valdivieso
By Henry K. Feist
Attorney _United States Patent Office_

2,782,987
Patented Feb. 26, 1957

2,782,987
APPARATUS FOR INDICATING THE MEAN SPEED OF A VEHICLE

Francesco Perrotti, Milan, and Mario Valdivieso, Rome, Italy

Application June 24, 1952, Serial No. 295,224

Claims priority, application Italy July 27, 1949

20 Claims. (Cl. 235—61)

This is a continuation-in-part application of our co-pending patent application Serial No. 175,559, filed on July 24, 1950, now abandoned.

This invention relates to an apparatus for the continuous indication of the ratio between the values of two independent variables, and more particularly to an apparatus for indicating, at any time, the mean speed of a vehicle, i. e. the ratio between the values of the distance travelled by the vehicle and of the time needed by the vehicle for traveling the distance.

Apparatus of this type make use of a logarithmic transformation so as to measure the mean speed of a vehicle $$v = \frac{e}{t}$$

($v$ indicating speed in miles/hour, $e$ indicating the travelled distance in miles, and $t$ indicating the time in hour) by $$\log v = \log e - \log t$$

An object of the present invention is to provide an apparatus for measuring the mean speed of a vehicle, wherein the mean speed may be readily read off from a scale having a linear calibration, although the angular displacements of the planet system of planetary gearing (epicyclic train gear) interposed between two logarithmic cams driven by an odometer and a time-piece respectively are proportional to the algebraic difference between the logarithms of the distance and the time. Interpolations between values of the equally spaced calibrations on a linear scale can be made easier and more accurate than interpolations between values of the decreasingly spaced calibrations on a logarithmic scale as they are used in hitherto customary apparatus for measuring the mean speed of a vehicle by means of logarithmic transformations.

Another object of the present invention is to provide an apparatus for indicating the mean speed of a vehicle wherein the axes of rotation of the logarithmic cam of the distance measuring system, of the logarithmic cam of the time measuring system, and of the indicating pointer coincide with the main axis of the apparatus.

A further object of the present invention is to provide an apparatus for indicating the mean speed of a vehicle wherein the time can be read directly from a clock-dial arranged concentrically to the scale calibrated for the mean speed.

Another object of the invention is to equip an apparatus for indicating the mean speed of a vehicle with a zeroizing mechanism having only a single setting knob for setting the logarithmic cams of the distance system and of the time system to the value zero.

A further object of the invention is to equip an apparatus for indicating the mean speed of a vehicle with means for rendering same active or inactive at will without changing the connections of its elements with the odometer and the time piece.

Another object of the invention is to improve on the art of apparatus for indicating the mean speed of vehicles as now ordinarily made.

Other objects and structural details of the invention will be apparent from the following description when read in conjunction with the accompanying drawings forming part of this specification, wherein:

Fig. 2 is a perspective view, seen from the rear of the apparatus shown in Fig. 1, said perspective view illustrating, on an enlarged scale, the planetary gearing and the coupling mechanism between the carrier of the planet gear and the pointer of the index of the apparatus;

Fig. 3 is a, partly diagrammatical, top plan view of a different embodiment of a coupling mechanism of an apparatus according to the invention, and Fig. 4 is a perspective view of a different embodiment of a zeroizing mechanism of an apparatus according to the invention.

Figure 1:
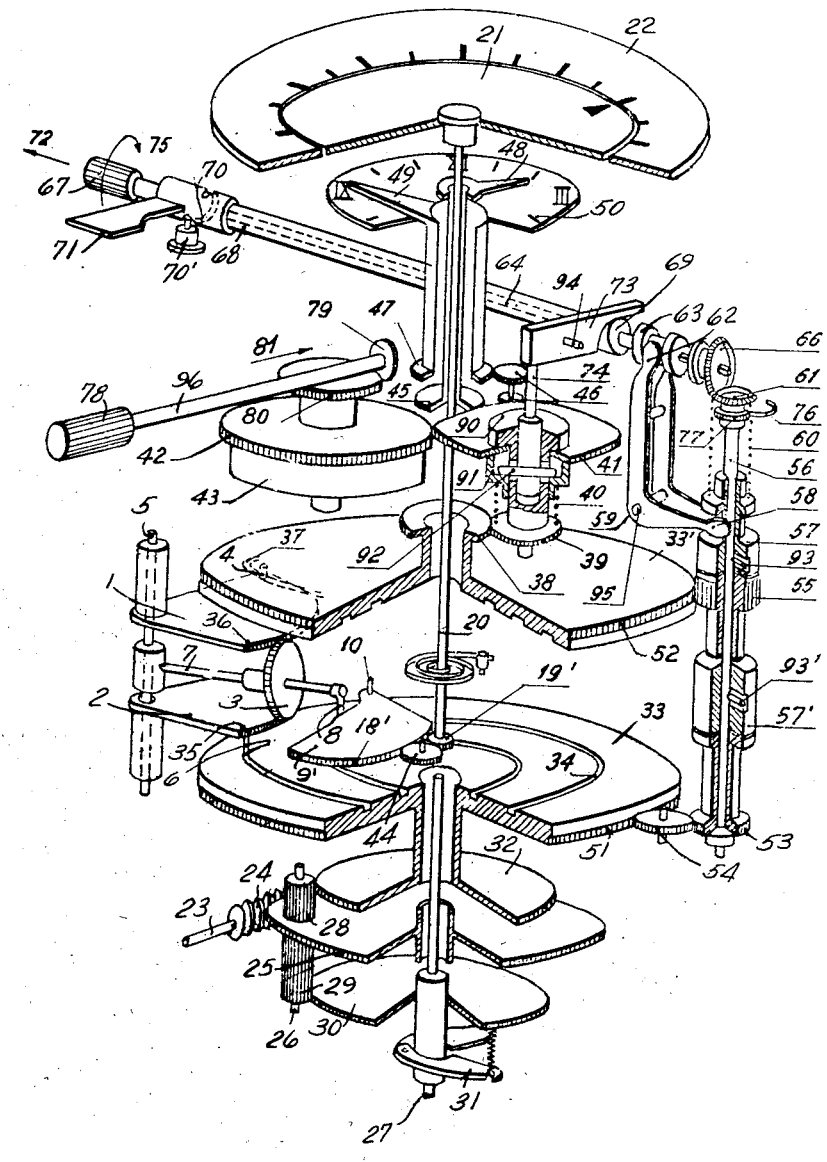
Fig. 1 is a perspective view, partially in section of an apparatus for indicating the mean speed of a vehicle according to the invention.

Referring now to Fig. 1, 23 generally indicates a shaft arranged for connection with an odometer or mileage counter (not shown). The shaft 23 rotatably arranged in the casing (not shown) of the apparatus rotates in proportion to the distance travelled by the vehicle wherein the apparatus for indicating the mean speed of the latter is mounted. The rotation of the shaft 23 starts at the moment when the apparatus is rendered active in the travelling vehicle. A worm 24 fixed to the shaft 23 is in mesh with a worm gear 25 rotatably mounted on a vertical shaft 27 journalled in the casing (not shown) of the apparatus. Another vertical shaft 26 rotatably mounted on the worm gear 25 is rigidly connected with a first planet pinion 28 arranged above the worm gear 25 and a second planet pinion 29 arranged below the latter. Said planet pinions 28 and 29 form parts of a planetary reducing transmission including the sun wheels 32 and 30, the former being in mesh with the planet pinion 28, the latter being in mesh with the planet pinion 29. One of the sun wheels 30, 32 has one tooth more than the other. The sun wheel 30 is normally held stationary by means of a spring-loaded brake 31; the sun wheel 32 is integral with a disc 33 having at its upper surface a logarithmic cam groove 34 of substantially spiral-shape, the radial coordinates of which correspond to the logarithms of the values of the rotations of shaft 23 connected with the odometer.

When the shaft 23 is rotated, the shaft 26 journalled in the worm gear 25 and carrying the planet pinions 28 and 29 is caused to rotate around the vertical shaft 27. As the sun wheel 30 is held in its position by the brake 31 and as there is one tooth difference in the sun wheels 30 and 32, the sun wheel 32 is advanced through an angle corresponding to one tooth for each revolution of the worm gear 25 causing the disc 33 to rotate through the same angle. Thus, the rotation of shaft 23 is transmitted to the disc 33 with the logarithmic cam groove 34 at a predetermined ratio of reduction.

A pin 6 (see Fig. 1 and 3) fixed to a sun gear sector 2 of a planetary gearing or epicyclic train gear 1, 2, 3, 5, 7 is in operative engagement with the logarithmic cam groove 34. The sun gear sector 2 being rotatable about a vertical shaft 5 mounted in the casing (not shown) is rotated in accordance with the displacements imparted to the pin 6 by the logarithmic cam groove 34.

The sun gear sector 2 having teeth 35 at its circumference, is in mesh with a planet gear 3 rotatable mounted on a carrying shaft 7, one end of which is secured to a sleeve mounted on the vertical shaft 5. The other end of said carrying shaft 7 is provided with a pin 8 for a purpose to be described later on.

As best shown in Fig. 1, the time-piece or clock 43 of the apparatus has a rotatable gear 42 driven by the drive of the time-piece in any suitable manner. Said gear 42 is in mesh with another gear 41 rotatably mounted on a sleeve-like first coupling element 90 having a flange at its upper end. A spring 40 arranged between a pinion 39 secured to said first coupling element 90 and a second coupling element 91 axially shiftably mounted on said first coupling element 90 tends to urge said second coupling element 91 against the lower surface of the gear 41 whereby the latter being pressed against the flange of the first coupling element 90 is held in frictional engagement with said two coupling elements 90 and 91. As long as the elements of above described frictional coupling are in engagement with each other the pinion 39 is rotated by the gear 42 of the time-piece 43 in proportion to the time. For a disengagement of the operative elements of the frictional coupling so as to interrupt the rotation of the pinion 39 by the time-piece 43, the second coupling element 91 may be axially displaced against the action of the spring 40 by a depression of a pin 74 carrying crossbar 92 engaged with the second coupling element 91. The means for depressing the pin 74 will be described later on.

The pinion 39 is in mesh with a gear 38 rotatable about an axis in alignment with the axis of the disc 33. Said gear 38 is integral with a disc 33' having at its lower surface a logarithmic cam groove 37 of substantially spiral shape, the radial coordinates of which correspond to the logarithms of the values of the rotations of the gear 42 of the time-piece 43.

A pin 4 (see Figs. 1 and 3) fixed to the second sun gear sector 1 of the planetary gearing 1, 2, 3, 5, 7 is in operative engagement with the logarithmic cam groove 37 of the disc 33'. The sun gear sector 1 being rotatable about the vertical shaft 5 of the planetary gearing is rotated in accordance with the displacements imparted to the pin 4 by the logarithmic cam groove 37.

The sun gear sector 1 having teeth 36 at its circumference is in mesh with the planet gear 3 arranged on the carrier 7 rotatable about the shaft 5.

Thus, when the apparatus is in operation the sun gear sector 1 actuated by the logarithmic cam groove 37 rotates in proportion to the logarithm of the time, while the sun gear sector 2 actuated by the logarithmic cam groove 34 rotates in proportion to the logarithm of the distance travelled by the vehicle.

The algebraic sum of the rotations of the two sun gear sectors 1 and 2 is taken up by the planet gear 3 meshing with teeth 36, 35 of said sun gear sectors. As a result the planet gear 3 rotating around the carrying shaft 7 causes the said carrying shaft 7 to rotate around the vertical shaft 5 by quantities equal to the algebraic sums of the logarithms of the intergrals of the two variables (distance and time) furnished by the logarithmic cam grooves 34 and 37. Thus the angular displacements of the planet carrier 7 around the shaft 5 are in proportion to logarithmic values resulting from the algebraic sum of the logarithmic values of said two independent variables.

In order to be able to use a scale 22 having a linear calibration instead of a logarithmic calibration the following coupling mechanism is arranged between the planet carrier 7 and the pointer or indicator 21.

As shown in Fig. 2 the pin 8 fixed to the free end of the carrying shaft 7 of the planetary gearing is in engagement with a camming surface of an arm 9 secured to a vertical shaft 10 journalled in the casing (not shown). A pinion 18 secured to the shaft 10 is in mesh with a pinion 19 secured to another vertical rotatable shaft 20 carrying the pointer 21 at its upper end. The axis of the shaft 20 is in alignment with the axis of rotation of the logarithmic cams 33' and 33, which in a preferred embodiment coincides with the main axis of the apparatus.

The pointer 21 cooperates with the scale 22 having a linear calibration. A spring 23 connected with a fixed point of the apparatus and with the shaft 20 tends to rotate the shaft 20 in such a direction that the arm 9 being urged in the direction of the arrow 11 is held in engagement with the pin 8 of the carrier 7.

Such a spring 23 can be omitted if, as shown in Fig. 3, the arm 9 is provided with a slot 13 of predetermined shape acting as a cam and being slidably engaged with the pin 8 of the carrier 7.

As best shown in Fig. 3, the pivot 10 of the arm 9 is at a distance D from the pivot 5 of the carrier 7. As will be readily understood, the arm 9 is compelled to rotate in the directions of the arrows 11, and 12 (Fig. 2) in dependence on the displacements of pin 8 caused by the planetary gearing 1, 2, 3, 5, 7. The distance D (Fig. 3) between the pivots 5 and 10 and the length L of the carrier 7 are chosen in such a way that the angular displacements of the arm 9 follow a law of variations different from that of the corresponding angular displacements of the carrier 7; more particularly, the relationship between D and L is chosen in such a way that, during a movement of the carrier 7 in clockwise direction, away from a line connecting the points 5 and 10, successive angles of rotation of the arm 9 corresponding to successive angles of rotation of the carrier 7 decrease gradually.

If the logarithms of certain numbers correspond to angles $\alpha$ of rotation of the carrier 7, the angles $\beta$ of rotation of the arm 9 correspond to the same numbers; thus, when the carrier 7 is rotated according to a logarithmic law, the arm 9 is rotated by the described mechanism in such a way that its rotation takes place according to a law of linear variation of the corresponding numerical values. This feature is realized sufficiently well for rather small values when the length L of the carrier 7 is larger than the difference between the distance D and said length L as shown in Fig. 3. These are constructional characteristics of an apparatus according to the invention.

As best shown in Fig. 3, the end portion of the slot 13 between the points 14 and 15 is curved in the shape of a circle having the radius L. Thus, when the pin 8 comes into engagement with said curved portion 14 and 15 during a movement in clockwise direction, it will slide along said curved portion without imparting a further rotation to the arm 9 in the direction of the arrow 12. Thus, the pin 8 may perform a rotary movement larger than that required for obtaining the desired ratio between the values of the angles $\alpha$ and $\beta$ by the cooperation of the pin 8 with portions of the slot 13 nearer to its closed end; furthermore, the pin 8 does not become disengaged from the slot during such an extended rotary movement beyond point 14.

According to the embodiment shown in Fig. 2, wherein the arm 9 has merely a camming surface instead of a slot cooperating with the pin and wherein the arm 9 is under the action of the spring 23, a stop 16 is arranged for abutting engagement with a projection 17 of the arm 9 so as to limit the movement of the latter in the direction of the arrow 11. Thus, the planet carrier 7 and the pin 8 fixed thereto may continue their movements in counter-clockwise direction (as viewed in Fig. 2) whereby the pin 8 becomes disengaged from the camming surface of the arm 9. Upon a return movement of the carrier 7, the pin 8 reengages the camming surface of the arm 9 in the same position wherein they separated before.

The useful angle through which the arm 9 is rotated during the operation of the apparatus, is rather small for the reasons set forth above. By means of the train of gears 18, 19 the rotation of the shaft 20 carrying the indicator 21 is proportionally increased relative to the rotation of the shaft 10 connected with the arm 9. As, for the reasons explained above, the non-uniform logarithmic rotations of the planet carrier 7 are converted into uniform rotations of the arm 9, shaft 10 and shaft 20, the numerical values corresponding to the logarithms determining the movements of the planet carrier 7 and pin 8 can be readily read off from the scale 22 having a linear calibration.

According to the embodiment shown in Fig. 1, the arm 9' actuated by the pin 8 is in the shape of a sector plate having teeth 18' at its circumference in mesh with an idler pinion 44 which in turn is in mesh with a pinion 19' secured to the shaft 20 carrying the indicator 21 being in the shape of a transparent disc provided with an arrow-mark.

As best shown in Fig. 1, the time-piece 43 drives through the train of gears 42, 41, 46, 47 the hour hand and through the train of gears 42, 41, 45 the minute hand arranged below the transparent disc 21 and above a dial 50 concentrically mounted to the axis of the shaft 20. Thus, the time can be readily read off from the dial 50 through the transparent disc 21.

The discs 33 and 33' having the logarithmic grooves 34 and 37 respectively may be zeroised by the following mechanism:

The disc 33 is provided with teeth 51 at its circumference being in mesh with an idler pinion 54 which in turn meshes with a toothed portion of a coupling member 53 loosely mounted on a vertical shaft 56 journalled in the casing (not shown). The lower surface of the coupling member 53 rests on a collar secured to the shaft 56. The upper surface of said coupling member 53 may come into frictional engagement with the lower surface of another coupling member 57' slidably mounted on the shaft 56; the coupling member 57' cannot be rotated relative to the shaft 56.

The disc 33' is provided with teeth 52 at its circumference being in mesh with a toothed portion of another coupling member 55 loosely mounted on the shaft and engaged at its lower end with the coupling member 57'. The upper end of said coupling member 55 may come into frictional engagement with the lower end of another coupling member 57 slidably mounted on the shaft 56; the coupling member 57 cannot be rotated relative to the shaft 56.

The coupling member 57 being substantially in the shape of a cylindrical body has an annular groove for engagement with the end 58 of a bell-crank lever pivotally mounted at 95. The other end 62 of the bell-crank lever 59 is in engagement with an annular groove of a sleeve 63 secured to a shaft 64 rotatably mounted in a tubular rod 68; the shaft 64 cannot be axially shifted relative to said tubular rod 68. An actuating knob 67 is secured to one end of the shaft 64. A bevel gear 66 is slidably mounted on the other end of said shaft 64; said bevel gear 66 cannot be rotated relative to the shaft 64. The bevel gear 66 is permanently in mesh with a bevel gear 61 secured to the upper end of the vertical shaft 56. A spring 60 arranged between said bevel gear 61 and the upper end of the coupling member 57 tends to urge the latter downwardly for bringing same into frictional engagement with the toothed coupling member 55 and for bringing—through the medium of the latter—the coupling member 57' in frictional engagement with the toothed coupling member 53.

When the coupling members 57, 55 and 57', 53 respectively are in frictional engagement with each other, a rotation of the knob 67, in the direction of the arrow 75, causing a rotation of the shaft 56 by the meshing bevel gears 66 and 61 and further causing a rotation of the coupling members 57 and 57' by pins 93 and 93' carried by the shaft 56 and engaged with recesses of said coupling members results in a rotation of the toothed coupling members 55 and 53 whereby the cam discs 33' and 33 may be rotated for setting same at zero. A rotation of the knob 67 in a reversed direction opposite to the direction of the arrow 75 is rendered impossible by the cooperation of a locking pawl 76 with a ratchet wheel 77 secured to the upper end portion of the shaft 56.

When the coupling members 57, 55 and 57', 53 respectively are in disengaged condition, the cam discs 33' and 33 meshing with the toothed coupling members 55 and 53 respectively may be rotated freely by the time-piece 43 and the odometer-shaft 23. This feature may be readily obtained by displacing the tubular member 68 carrying the sleeve 63 in the direction of the arrow 72 whereby the bell-crank lever 59 engaged with said sleeve and with the coupling member 57 lifts the latter against the action of the spring 60 away from the toothed coupling member 55 so that both toothed coupling members 55 and 53 are free to rotate relative to the shaft 56.

The tubular rod 68 carries at its right hand end portion (as viewed in Fig. 1) a cam 69 engaged with one arm of a double-armed lever 73 pivoted at 94. The other arm of said double-armed lever 73 is in engagement with the spring-loaded pin 74 of the friction clutch 40, 90, 91.

The other end of the tubular rod 68 is provided with a helical groove 70 engaged with a fixed pin 70'. Furthermore a lever 71 is attached to said other end of the tubular rod 68.

When the tubular rod 68 is in the angular position shown in Fig. 1 and is displaced outwardly in the direction of the arrow 72, the dwell of the cam 69 is in engagement with the lever 73 so that there is no action in the pin 74 of the friction clutch 40, 90, 91 and the elements of the latter are in operative engagement. In other words, in this position of the tubular rod 68 the time-piece 43 may rotate the cam disc 33' through the gears 43, 41, 39, 38 inasmuch as in this position of the tubular rod 68 the bell-crank lever 59 actuated by the sleeve 63 causes a disengagement of the frictional coupling members 57, 55 and 57', 53 of the zeroizing mechanism in the manner described above. If the knob 67 attached to the shaft 64 would be rotated while the tubular rod 68 is in the outwardly displaced position described above, it would merely cause an idle rotation of the coupling members 57 and 57' without any influence on the cam discs 33' and 33.

Now, when the lever 71 is rotated in the direction of the arrow 75, the tubular rod 68 is displaced inwardly in a direction opposite to the direction of the arrow 72 owing to the engagement of the helical groove 70 with the fixed pin 70'. Thus, the shaft 64 is likewise shifted inwardly causing a rotation of the bell-crank lever 59 about its pivot 95 whereby the end 58 of the bell-crank lever is disengaged from the lower surface of the flange like portion of the upper end of the coupling member 57, thus permitting a frictional engagement of the coupling members 57, 55 and 57', 53 by the action of the spring 60 pushing the coupling member 57 downwardly.

During said inward displacement of the tubular rod 68 by a rotation of the lever 71 the cam 69 connected with said tubular rod 68 is also rotated. Thus, the raised portion of the cam 69 comes into engagement with the double-armed lever 73 whereby the latter is swung about its pivot 94 causing a depression of the pin 74 against the action of the spring 40. Thus, the elements of the friction clutch 40, 90, 91 between the time-piece 43 and the cam disc 33' are disengaged, so that the drive of the cam disc 33' by the time-piece 43 is interrupted.

Now, when the knob 67 is rotated in the direction of the arrow 75, the cam discs 33' and 33 are rotated by the bevel gears 66, 61 through the medium of the frictional coupling 57, 55, 57', 53 the elements of which are now in operative engagement. Thus, the cam discs 33' and 33 may be returned to their initial or zero positions. Each cam disc will be stopped independently from the other as soon as the pin 4 or 6 of the associated sun gear sector 1 or 2 comes into engagement with the end of the logarithmic groove 37 or 34.

During such a resetting to zero position the cam disc 33' may be freely rotated as the elements of the friction clutch 40, 90, 91 are disengaged at this time as described above. The return rotation of the cam disc 33 causes a rotation of the sun wheel 30 through the planet wheels 28 and 29, as the sun wheel 30 may overcome the friction exerted by the action of brake 31. The brake 31 is designed in such a manner that its moment of the braking couple is smaller than that provided for between the pinions 54, 53 and the shaft 56 but higher, by a good margin, than that necessary for rotating the sun gear sector 35 through the sets of gears mentioned above.

Owing to the locking pawl 76 cooperating with the ratchet wheel 77 the knob 67 can be rotated only in the direction of the arrow 75 for resetting the cam discs 33 and 33′ into their initial or zero position. A rotation of the cam discs 33 and 33′ by the knob 67 in opposite direction is impossible.

A rotatable and axially shiftable shaft 96 carries at one of its ends a knob 78 and at its other end a pinion 79. When the shaft 96 is in the position shown in Fig. 1, the pinion 79 is in mesh with a gear 80 rigidly connected with the gear 42 of the time-piece 43; then, the time-piece 43 may be wound up by rotating the knob 78. When the shaft 96 is displaced in the direction of the arrow 81, the pinion 79 may be brought into engagement with the gear 47 for setting the hands 48 and 49, if necessary.

The zeroizing mechanism described above in connection with Fig. 1 is suitable for arrangement at the side of the apparatus.

Fig. 4 illustrates a modification of a zeroizing mechanism suitable for arrangement inside the overall diameter of the apparatus; in said Fig. 4, elements corresponding to elements described above in connection with Fig. 1 are indicated by the same reference numerals, which, however, are double prime numerals.

According to Fig. 4, the actuating knob 67″ is secured to an extension of the shaft 56″. The lever 71″ is attached to a sleeve 97 rotatably mounted on the upper end of the shaft. Both, the knob 67″ and the lever 71″ may be rotated about an axis coinciding with the axis of the shaft 56″. The end 62″ of the bell-crank lever 59″ is engaged with the annular groove of a sleeve 63″ mounted on shaft 64″ and operatively engaged with a cam 82 secured to or integral with the rotatable sleeve 97. One arm of the double-armed lever 73″ is in engagement with a cone 83 rigidly connected with the sleeve 63″ for participating in the movements of the latter. A spring 84 tends to hold the sleeve 63″ in engagement with the cam 82. When the lever 71″ is rotated in the direction of the arrow 75″, the sleeve 63″ following the cam 82 is displaced in right hand direction (as viewed in Fig. 4) whereby the bell-crank lever 59″ is swung clockwise for making the apparatus ready for zeroizing. A return movement of the lever 71″ in a direction opposite to the direction of the arrow 75″ makes the apparatus ready for measuring operation.

As will be readily understood, the operation of an apparatus according to the invention is as follows:

The apparatus is made ready for operation by turning the lever 71 (or the lever 71″ respectively if the device is equipped with the zeroizing mechanism shown in Fig. 4) opposite to the direction of the arrow 75 (or the arrow 75″ respectively in reference to Fig. 4). The logarithmic cam 33, 34 driven by the shaft 23 connected with the odometer is rotated in accordance with the distance travelled by the vehicle. The logarithmic cam 33′, 37 driven by the time-piece 43 is rotated in accordance with the time. The planet carrier 7 rotates around the shaft 5 according to the logarithms of the difference between the logarithms of the distance and of the time. This difference is collected and transformed into corresponding numerical values by the coupling sector 9′ (Fig. 1) which causes a corresponding rotation of the shaft 20 and indicator 21. Said indicator 21 moving along a scale 22 with uniform graduation permits an instant reading off of the value of the ratio between the two variables introduced into the apparatus, for example the ratio between the distance and the time, i. e. the mean speed.

When it is desired to reset the logarithmic cams 33 and 33′ to zero, the lever 71 (or the lever 71″ respectively, if the device is equipped with a zeroizing mechanism according to Fig. 4) is rotated in the direction of the arrow 75 (or 75″ respectively in reference to Fig. 4) whereby the time-piece 43 is disconnected from the logarithmic cam 33′ and the zeroizing mechanism is rendered active for zeroizing the apparatus by a rotation of the knob 67 or (knob 67″ respectively in reference to Fig. 4).

The time may be read off at any time from the dial 50 below the transparent disc 21.

The clock 43, 48, 49, 50 may be wound up or set by means of the knob 78 depending on the outward or inward position thereof.

We have described preferred embodiments of our invention, but it is understood that this disclosure is for the purpose of illustration and that various omissions or changes in shape, proportion and arrangement of parts, as well as the substitution of equivalent elements for these, herein shown and described, may be made without departing from the spirit and scope of the invention as set forth in the appended claims.

The use of an apparatus according to the invention is not restricted to the indication of the mean speed of a vehicle. For example the rotatable shaft 23 (Fig. 1) may be connected with a drive other than an odometer. Thus, the apparatus may be used for indicating the ratio between two independent variables of any suitable kind.

What we claim is:

1. An apparatus for indicating the mean speed of a vehicle, comprising in combination: a rotatable shaft for connection with an odometer, a first rotatable logarithmic cam means, a first coupling including frictionally engaged means arranged between said shaft and said first logarithmic cam means, a time-piece, a second rotatable logarithmic cam means, a second coupling including frictionally engaged means arranged between said time-piece and said second logarithmic cam means, a planetary gearing including a first and second rotatable sun gear operatively engaged with a planet gear mounted on a swingable carrier, said first sun gear being operatively connected with said first logarithmic cam means for actuation by the latter, said second sun gear being operatively connected with said second logarithmic cam means for actuation by the latter, a pair of cooperating relatively movable indicating means, one of said indicating means being stationary the other one being operatively connected with said swingable carrier for actuation by the latter so as to indicate a mean speed value in accordance with the algebraic difference between the logarithms of the distance and of the time, and manually operable zeroizing means operatively connected with said first and second logarithmic cam means for setting same into a starting position in accordance with the value zero, the frictionally engaged means of at least one of said couplings being permanently engaged with each other and being displaceable relative to each other under the action of said zeroizing means.

2. An apparatus for indicating the mean speed of a vehicle, comprising in combination: a rotatable shaft for connection with an odometer, a first rotatable logarithmic cam means coupled with said rotatable shaft for actuation by the later, a time-piece, a second rotatable logarithmic cam means coupled with said time-piece for actuation by the latter, a planetary gearing including a first and a second rotatable sun gear operatively engaged with a planet gear mounted on a swingable carrier, said carrier being in the shape of a shaft swingable about an axis perpendicular to its longitudinal axis, said first sun gear being operatively connected with said first logarithmic cam means for actuation by the latter, said second sun gear being operatively connected with said second logarithmic cam means for actuation by the latter, a stationary scale having a linear calibration, a rotatable indicator cooperting with said scale, and an arm rotatable about an axis spaced from and parallel to the swing-axis of said planet gear carrying shaft, said arm being operatively connected with said indicator and having a cam surface shiftably engaged with a point of said carrying shaft, said cam surface of said arm being of a predetermined shape for converting angular displacements of said carrying shaft about its swing-axis, imparted to said carrying shaft in direct proportion to the algebraic difference between the logarithms of the distance and of the time, into uniform angular displacements of said arm and the indicator connected with the latter whereby a mean speed value is indicated by the cooperation of said indicator with the scale having a linear calibration.

3. In an apparatus as claimed in claim 2, the length of said carrying shaft between its swing-axis and its point of engagement with the cam surface of said arm being larger than the difference between the distance between the swing-axes of said carrying shaft and of said arm and said length of said carrying shaft.

4. In an apparatus as claimed in claim 2, a first rotatable rod carrying said indicator, a second rotatable rod carrying said arm, and a train of gear interposed between said two rods.

5. In an apparatus as claimed in claim 2, said cam surface of the arm being included in a slot of said arm, and a pin on said carrying shaft engaged with said slot.

6. In an apparatus as claimed in claim 2, said cam surface of the arm constituting a portion of a side edge of said arm, a pin on said carrying shaft engaged with said side edge of the arm and resilient means acting on said arm for holding its side edge in engagement with said pin.

7. In an apparatus as claimed in claim 1, said indicator being in the shape of a rotatable disc of transparent material having a mark for cooperation with said scale, said time-piece including a driving mechanism, hands and a dial, said hands and dial being arranged below said transparent disc, and a connecting mechanism operatively connecting said driving mechanism of the time-piece with said hands.

8. In an apparatus as claimed in claim 1, said movable indicating means being in the shape of a rotatable disc of transparent material having a mark for cooperation with said stationary indicating means, said time-piece including a driving mechanism, hands and a dial, said hands and dial being arranged below said transparent disc, and a connecting mechanism operatively conecting said driving mechanism of the time-piece with said hands, said rotatable disc, said dial and said first and second logarithmic cam means being in coaxial alignment with each other.

9. In an apparatus as claimed in claim 1, manually operable disengaging means associated with said second coupling for disengaging its frictionally engaged means whereby the time-piece may be disconnected from said second logarithmic cam means.

10. In an apparatus as claimed in claim 1, said zeroizing means including disengaging means associated with said second coupling for automatically disengaging the frictionally engaged means of the second coupling so as to disconnect the time-piece from the second logarithmic cam means simultaneously with an actuation of said zeroizing means for resetting the logarithmic cam means into their starting position.

11. In an apparatus as claimed in claim 1, said zeroizing means including third coupling means having a first set of rotatable cooperating coupling elements and a second set of rotatable cooperating coupling elements, one coupling element of said first set being operatively connected with said first logarithmic cam means, one coupling element of said second set being operatively connected with said second logarithmic cam means, a movable setting element operatively connected with the other coupling elements of both sets of coupling elements for rotating same, and manually operable controlling means associated with said third coupling means for engaging and disengaging the coupling elements of both sets of coupling elements.

12. In an apparatus as claimed in claim 1, said zeroizing means including third coupling means having a first set of rotatable cooperating coupling elements and a second set of rotatable cooperating coupling elements, one coupling element of said first set being operatively connected with said first logarithmic cam means, one coupling element of said second set being operatively connected with said second logarithmic cam means, a movable setting element operatively connected with the other coupling elements of both sets of coupling elements for rotating same, manually operable controlling means associated with said third coupling means for engaging and disengaging the coupling elements of both sets of coupling elements, and disengaging means associated with said second coupling for disengaging its frictionally engaged means, said manually operable controlling means being in operative engagement with said disengaging means for causing an actuation thereof simultaneously with an engagement of the coupling elements of said third coupling means whereby said time-piece is disconnected from said second logarithmic cam means when said zeroizing means is made ready for a zeroizing operation.

13. In an apparatus as claimed in claim 1, said zeroizing means including third coupling means having a first set of rotatable cooperating coupling elements and a second set of rotatable cooperating coupling elements, one coupling element of said first set being operatively connected with said first logarithmic cam means, one coupling element of said second set being operatively connected with said second logarithmic cam means, an axially displaceable controlling shaft extending in a direction perpendicular to the plane of the axes of said logarithmic cam means, said controlling shaft being operatively connected with said third coupling means for engaging and disengaging the coupling elements of both sets of coupling elements upon a displacement in the direction of its longitudinal axis, disengaging means associated with said second coupling for disengaging its frictionally engaged means, a first controlling cam secured to said controlling shaft and operatively engaged with said disengaging means for causing an actuation thereof upon a displacement of said controlling shaft in the direction of its longitudinal axis, a rotatable setting rod extending in a direction parallel to the axes of said logarithmic cam means, the other coupling elements of both sets of coupling elements being arranged on and operatively connected with said setting rod, manually operable actuating means rotatably mounted on said setting rod, and a second cam secured to said actuating means and operatively engaged with said controlling shaft for displacing the latter.

14. In an apparatus as claimed in claim 1, said zeroizing means including third coupling means having a first set of rotatable cooperating coupling elements and a second set of rotatable cooperating coupling elements, one coupling element of said first set being operatively connected with said first logarithmic cam means, one coupling element of said second set being operatively connected with said second logarithmic cam means, a hollow controlling shaft, said controlling shaft being rotatable and being axially displaceable, said controlling shaft being operatively connected with said third coupling means for engaging and disengaging the coupling elements of both sets of coupling elements upon a displacement in the direction of its longitudinal axis, disengaging means associated with said second coupling for disengaging its frictionally engaged means, a controlling cam secured to said controlling shaft and operatively engaged with said disengaging means for causing an actuation thereof upon a rotation of said controlling shaft, manually operable actuating means associated with said controlling shaft for rotating and displacing same simultaneously, and a setting rod rotatably mounted in said hollow controlling shaft and operatively connected with the other coupling elements of both sets of coupling elements for rotating same.

15. In an apparatus as claimed in claim 14, said hollow controlling shaft extending in a direction perpendicular to the plane of the axes of said logarithmic cam means a second rotatable rod, said second rod extending in a direction parallel to the axes of said logarithmic cam means, said other coupling elements being arranged on and operatively connected with said second rod, and a set of cooperating bevel gears interposed between said setting rod and said second rod.

16. A zeroizing mechanism for use in combination with a mean speed indicator having first rotatable logarithmic cam means and second rotatable logarithmic cam means, said zeroizing mechanism comprising in combination: coupling means having a first set of rotatable cooperating coupling elements and a second set of rotatable cooperating coupling elements, one coupling element of said first set being arranged for operative connection with said first logarithmic cam means, one coupling element of said second set being arranged for operative connection with said second logarithmic cam means, a movable setting element operatively connected with the other coupling elements of both sets of coupling elements for rotating same, and manually operable controlling means associated with said coupling means for engaging and disengaging the coupling elements of both sets of coupling elements.

17. A zeroizing mechanism for use in combination with a mean speed indicator having first rotatable logarithmic cam means for connection with an odometer, second logarithmic cam means, a time-piece and a clutch between said time piece and said second logarithmic cam means, said zeroizing mechanism comprising in combination: coupling means having a first set of rotatable cooperating coupling elements and a second set of rotatable cooperating coupling elements, one coupling element of said first set being arranged for operative connection with said first logarithmic cam means, one coupling element of said second set being arranged for operative connection with said second logarithmic cam means, a movable setting element operatively connected with the other coupling elements of both sets of coupling elements for rotating same, disengaging means arranged for disengaging the coupling elements of said coupling means, and manually operable controlling means associated with said coupling means for engaging and disengaging the coupling elements of both sets of coupling elements, said manually operable controlling means being in operative engagement with said disengaging means for causing an actuation thereof simultaneously with an engagement of the coupling elements of said coupling means of the zeroizing mechanism.

18. A zeroizing mechanism for use in combination with a mean speed indicator having first rotatable logarithmic cam means for connection with an odometer, second logarithmic cam means, a time-piece and a clutch between said time-piece and said second logarithmic cam means, said zeroizing mechanism comprising in combination: coupling means having a first set of rotatable cooperating coupling elements and a second set of rotatable cooperating coupling elements, one coupling element of said first set being arranged for operative connection with said first logarithmic cam means, one coupling element of said second set being arranged for operative connection with said second logarithmic cam means, a hollow controlling shaft, said controlling shaft being rotatable and being axially displaceable, said controlling shaft being operatively connected with said coupling means of the zeroizing mechanism for engaging and disengaging the coupling elements of both sets of coupling elements upon a displacement in the direction of its longitudinal axis, disengaging means arranged for disengaging the coupling elements of said coupling means, a controlling cam secured to said controlling shaft and operatively engaged with said disengaging means for causing an actuation thereof upon a rotation of said controlling shaft, manually operable actuating means associated with said controlling shaft for rotating and displacing same simultaneously, and a setting rod rotatably mounted in said hollow controlling shaft and operatively connected with the other coupling elements of both sets of coupling elements for rotating same.

19. In a zeroizing mechanism as claimed in claim 18, a second rotatable rod extending perpendicular to the direction of the longitudinal axis of said hollow controlling shaft, said other coupling elements being arranged on and operatively connected with said second rod, and a set of cooperating bevel gears interposed between said setting rod and said second rod.

20. A zeroizing mechanism for use in combination with a means speed indicator having first rotatable logarithmic cam means for connection with an odometer, second logarithmic cam means, a time-piece and a clutch between said time-piece and said second logarithmic cam means, said zeroizing mechanism comprising in combination: coupling means having a first set of rotatable cooperating coupling elements and a second set of rotatable cooperating coupling elements, one coupling element of said first set being arranged for operative connection with said first logarithmic cam means, one coupling element of said second set being arranged for operative connection with said second logarithmic cam means, an axially displaceable controlling shaft, said controlling shaft being rotatable and being axially displaceable, said controlling shaft being operatively connected with said coupling means of the zeroizing mechanism for engaging and disengaging the coupling elements of both sets of coupling elements upon a displacement in the direction of its longitudinal axis, disengaging means arranged for disengaging the coupling elements of said coupling means, a first controlling cam secured to said controlling shaft and operatively engaged with said disengaging means for causing an actuation thereof upon a displacement of said controlling shaft in the direction of its longitudinal axis, a rotatable setting rod, the other coupling elements of both sets of coupling elements being arranged on and operatively connected with said setting rod, manually operable actuating means rotatably mounted on said setting rod, and a second cam secured to said actuating means and operatively engaged with said controlling shaft for displacing the latter.

References Cited in the file of this patent

UNITED STATES PATENTS

| | | |
|---|---|---|
| 1,415,004 | Watson | May 2, 1922 |
| 1,652,896 | Higginson | Dec. 13, 1927 |
| 1,889,876 | Pellerin et al. | Dec. 6, 1932 |
| 1,895,347 | Salomon et al. | Jan. 24, 1933 |

FOREIGN PATENTS

| | | |
|---|---|---|
| 231,619 | Great Britain | Apr. 9, 1925 |